Feb. 9, 1943.　　　J. M. REYNOLDS　　　2,310,653
ROTARY ENGINE
Filed March 29, 1941　　　6 Sheets-Sheet 1

Fig. 1

INVENTOR:
Jeanne M. Reynolds
BY Robb & Robb
ATTORNEYS.

INVENTOR:
Jeanne M Reynolds
BY Robb & Robb
ATTORNEYS.

Patented Feb. 9, 1943

2,310,653

UNITED STATES PATENT OFFICE 2,310,653

ROTARY ENGINE

Jeanne M. Reynolds, Akron, Ohio

Application March 29, 1941, Serial No. 385,959

20 Claims. (Cl. 123—14)

The present invention appertains to the art of internal combustion engines and comprises a motor of this type involving the use of an annular cylinder providing combustion chambers in which operate pistons connected with a suitable drive shaft, said pistons moving in a continuous path in said cylinder.

The invention involves primarily novel piston mechanisms or units working in the annular cylinder in cooperation with radially slidable abutments between which and the piston units the charges of fuel or combustible gas are received and exploded.

The piston units themselves are of novel construction, utilizing mechanical means for effecting an expanding movement of the piston members, including special springs for this purpose susceptible of being compressed by the explosion taking place in the combustion chamber or chambers of the cylinder. The piston units also involve mechanical devices for effecting movement of the piston members corresponding to that effected by the exploding gases in each combustion chamber, for purposes to be more fully developed hereinafter.

The construction of the invention also involves the employment of a central driving shaft, about which the annular cylinder containing the piston members is concentrically arranged. The various piston units, which are the moving elements of the engine, are so disposed as to be balanced, and the driving torque thereof is likewise balanced by the arrangement and operation of said units in the action of the engine.

The invention involves other details of construction and phases of operation that will be presented more fully hereinafter in conjunction with the annexed drawings, in which.

Referring to the drawings and describing the specific construction of my engine, there is illustrated the annular or circular cylinder which is preferably made in two sections, 2 and 3. The outermost peripheral portions are equipped with flanges 2′, 3′ having bolts 4 passing therethrough to unite the sections at the peripheral portion 1 of the cylinder. The sections 2 and 3 of the cylinder are of somewhat semi-circular form in cross section, with their outer portions abutting, as previously described, so as to be firmly attached together by the bolts 4, whilst the innermost portions of the cylinder sections are spaced apart as at 6 to accommodate the passage therethrough of parts now to be described.

The cylinder may be supported in a suitable manner upon a housing 7 which may be of generally circular conformation, having peripheral flange portions 7' attached to the cylinder by means of the bolts 4 that connect the cylinder sections 2 and 3 together.

Figures 2, 9, 10, 11:
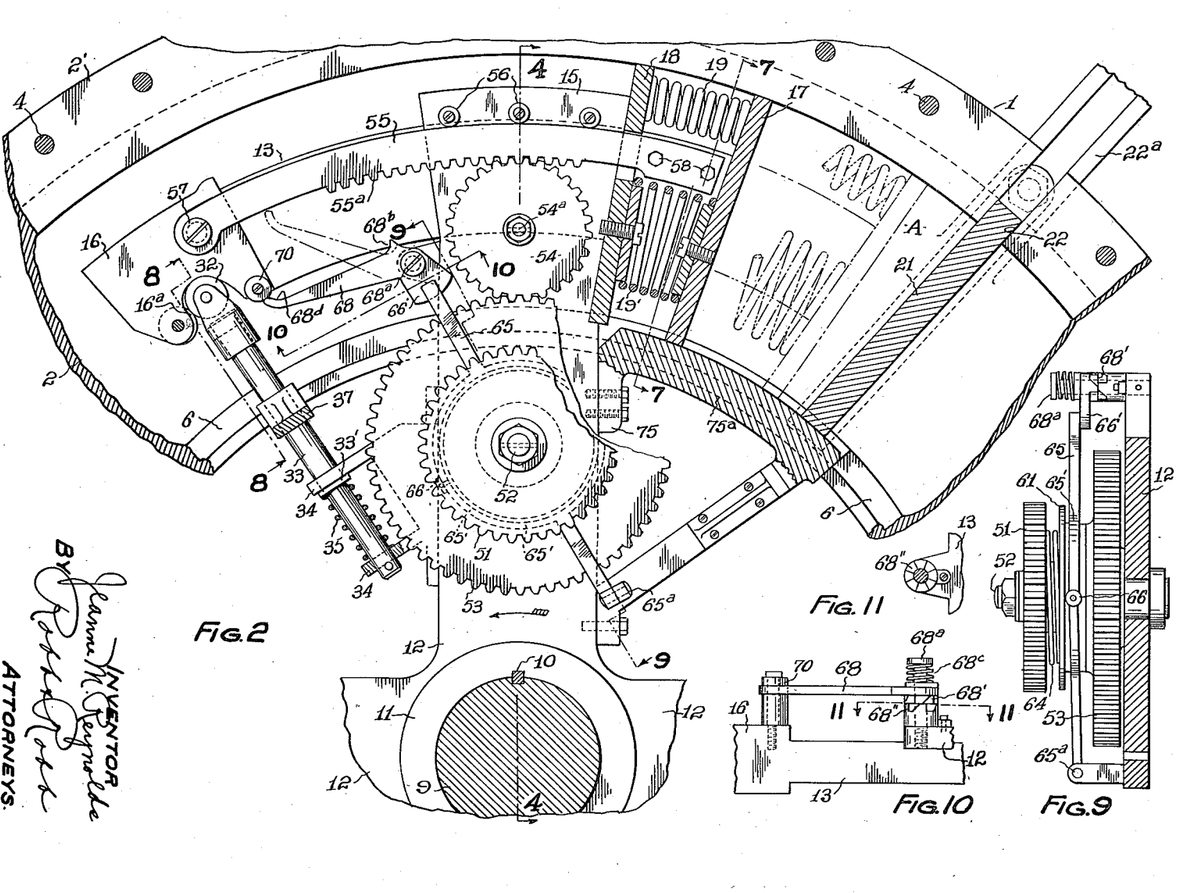
Figure 2 is a fragmentary vertical sectional view taken about centrally of the plane of the engine and showing a portion of the annular cylinder, one of the piston mechanisms or units thereof with the controlling devices therefor, and the relation between the piston mechanism, cylinder, and the central or concentric driving shaft.
Figure 9 is a transverse sectional view taken about on the line 9—9 of Figure 2, disclosing more particularly certain clutch devices and gearing by which the movable piston member is actuated.
Figure 10 is a detail sectional view taken about on the line 10—10 of Figure 2, disclosing certain automatic cam devices for operating the clutch devices shown particularly in Figure 9.
Figure 11 is a detail view on the line 11—11 of Figure 10, showing the camming surfaces, looking from the top.
Figure 4:
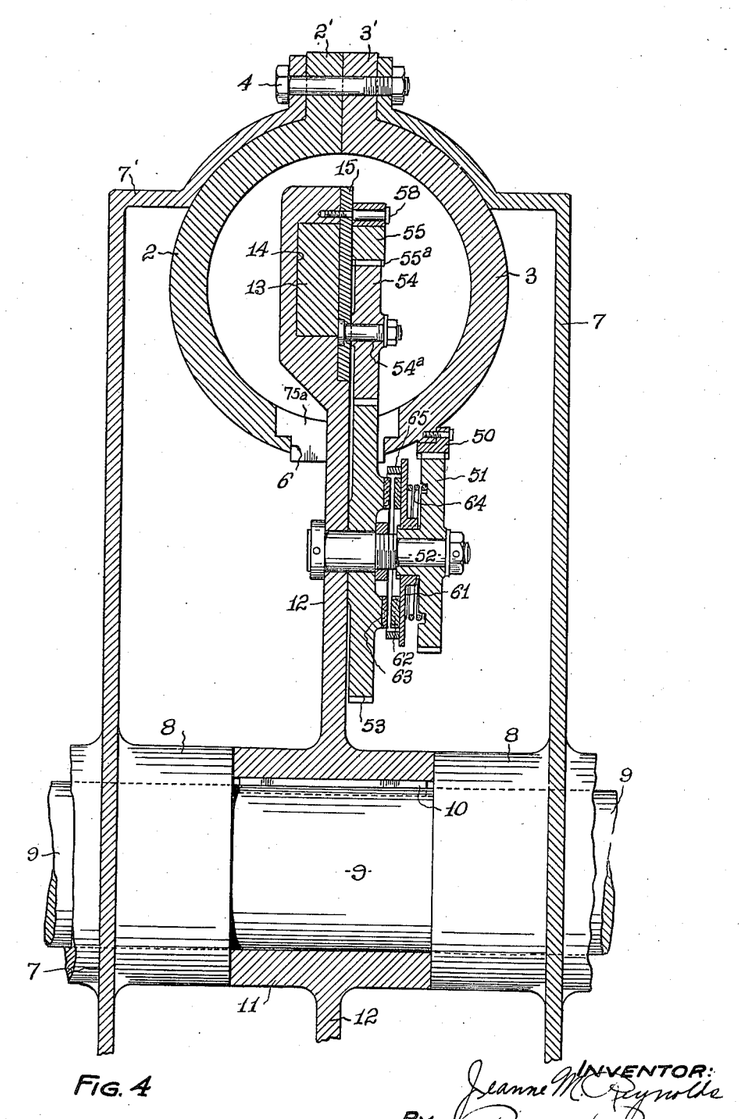
Figure 4 is a vertical sectional view taken about on the line 4—4 of Figure 2.

Concentric in relation to the cylinder aforesaid is the central bearing 8 of the housing 7, through which passes the drive shaft 9, and, carried by the drive shaft directly, by being keyed thereto as at 10, is a central hub 11, from which extends a series of radial driving arms 12 that lead outwardly and radially from the drive shaft 9 through the space 6 at the inner periphery of the cylinder and enter the annular chamber of the cylinder as seen best in Figures 2 and 4.

Four radial driving arms 12 are illustrated, but of course within the purview of the invention any suitable number of these arms may be provided, and for each member there is correspondingly provided piston mechanism shortly to be described.

Since each arm 12 and its cooperating piston unit and mechanism are the same, only one set of these parts will be described in detail, along with the associated directly coacting parts, a set of which would be utilized for each piston mechanism and arm. Each arm 12 carries at its outer end and within the cylinder, an arc shaped head 13 disposed in a slot or recess 14 at the outer end of the arm 12, as seen best in Figure 4, and movable through the recess 14. The head 13 is guided in the recess 14 of the arm 12 by means of a plate 15 suitably bolted to the member 12, and the head 13 is provided at one end with a locking and operating member 16. At its other end the head 13 is provided with a movable piston member 17, suitably fastened thereto, and conforming in external dimension with the internal conformation of the cylinder so as to slide in the latter with the periphery of the member 17 in contact with the inner walls of the cylinder.

The head 13 likewise carries, in spaced relation to the movable piston member 17, a coacting piston member 18, the parts 17 and 18 forming a piston or piston unit and being movable toward and from each other. The piston constituted by the members 17 and 18, as will now be shown, is virtually an expansible and contractable piston.

Interposed between the piston members 17 and 18 is a series of coiled springs 19 and 19', the normal action of which is to expand and separate the members so that they assume the positions in which they are illustrated in Figure 2 in dotted lines, their contracted positions being illustrated in full lines. The piston member 18 abuts with the adjacent side of the arm 12 and is attached thereto, being of similar conformation to the piston member 17.

Carried upon the annular cylinder of the engine is a series of radially slidable abutments 21 designed to block off the cylinder into a series of combustion chambers by reason of the relation of the said abutments to the piston units. In other words, it is contemplated that the cylinder shall be supplied with suitable inlet valves to direct explosive charges of fuel into the cylinder in the space between an abutment 21 and an adjacent piston unit, which space will be a closed space according to the construction of the engine, at certain times during which the explosion of the gaseous fuel mixture takes place.

Figure 5:
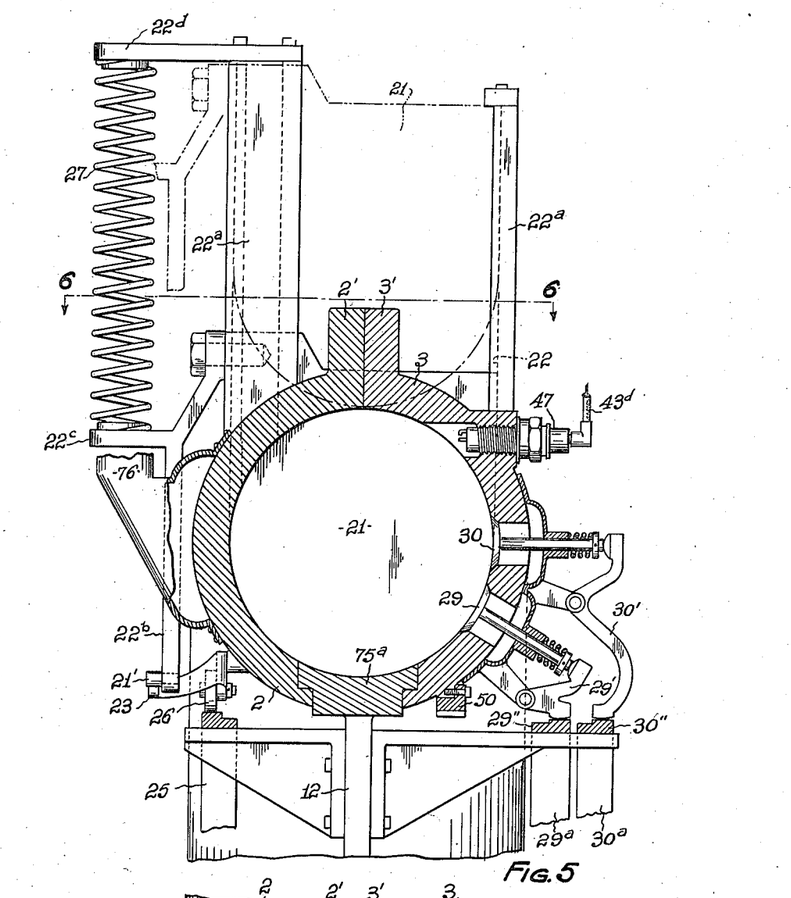
Figure 5 is a sectional view taken about on the line 5—5 of Figure 1, bringing out the mounting of the sliding abutments and disclosing more particularly the disposition of certain of the intake valves and the operating members for the latter.
Figure 6:
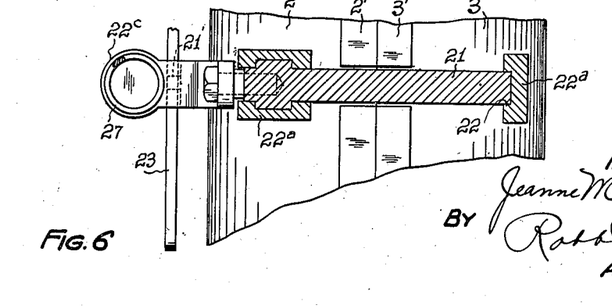
Figure 6 is a cross sectional view taken about on the line 6—6 of Figure 5, looking downwardly.
Figure 7:
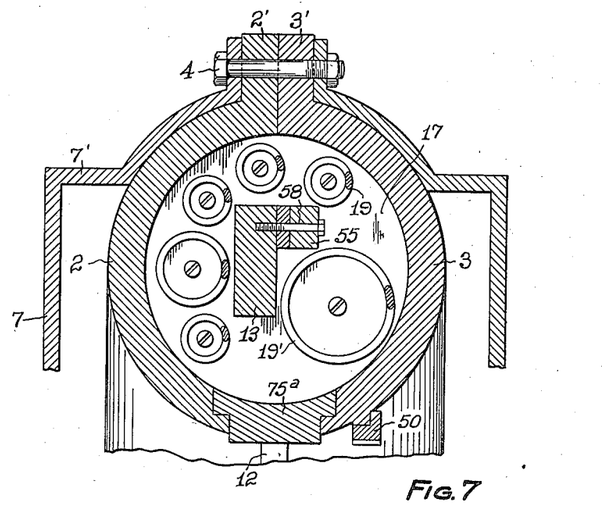
Figure 7 is a transverse sectional view taken about on the line 7—7 of Figure 2.

Each abutment 21 is shaped at its lower portion to be of somewhat circular formation to conform with the inner conformation of the cylinder, and each abutment operates through an opening in the outer portion of the slot 22 where the abutment is located and slides in guides at the side walls of the cylinder sections 2' and 3', and in radially extending guide members 22a that project outwardly from the cylinder at the point where the abutment 21 is located, see Figure 5.

Figure 3:
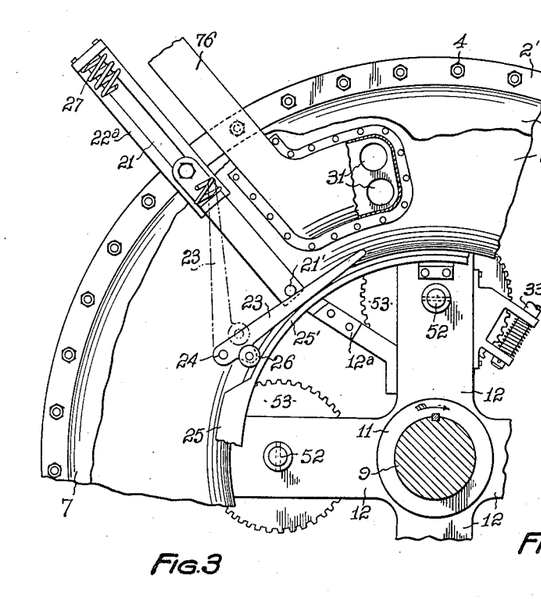
Figure 3 is a fragmentary side elevation showing more particularly the instrumentalities for effecting radial inward and outward movement of the radially slidable abutments which cooperate with the annular cylinder to establish the combustion chambers working in conjunction with the piston members, also the disposition of the muffler means.

The means for moving each abutment 21 radially outward relatively to the cylinder so that it assumes a position not obstructing the circular passage of the cylinder as the piston units 17 and 18 approach the abutment comprises a lever 23, see Figure 3, which lever is pivoted at 24 and has an intermediate portion thereof engaging a lateral pin 21' extending from the inner end of the abutment spring seat bracket 22b and external to the cylinder itself. The lever 23 is capable of being actuated by the engagement of a roller 26 thereon with a cam 25, one of which is provided for each lever and carried by a ring 25' supported on the driving arms 12 by brackets 12a to rotate with the latter at one side of the cylinder. As the cams 25 rotate, each of them is adapted to engage the roller 26 of lever 23 and thus shift outwardly the coacting abutment 21 just before the piston unit reaches a position in the cylinder which would cause it to strike the abutment were the latter not displaced. Spring means 27 for each abutment and seated on arms 22c and 22d is utilized to push the abutment inwardly into its operating position in the cylinder.

There being four of the abutment members 21 and four driving arms 12, effectively speaking, there will be provided for the annular cylinder 4 combustion chambers and piston units and associated mechanisms. For each of these combustion chambers, into which the cylinder is practically divided by reason of the location of the inlet and exhaust ports and ignition devices, there will be used, as seen in Figure 5, an inlet valve 30 for the fuel or gas to be charged into the chamber and a scavenging valve 29, the same adapted for proper timed operation by the cam actuating levers 30' and 29', respectively. The cams which operate the valve levers 29' and 30' are shown at 29'' and 30'', as being carried by cam rings 29a for the valve 29 and 30a for the valve 30.

In the cylinder section 2 and located about as shown in Figure 3 some distance circumferentially beyond the location of the ports 29 and 30 are provided the exhaust openings or ports 31 leading to a muffler 76, the operation of the invention being such that a source of compressed air, as for instance the conduit 29b through casing 29c, will be connected to the port controlled by the air valve 29, and when said valve is opened after the piston member 17 passes the location of the valve and at the end of the power stroke, scavenging air will be introduced into the combustion chamber at the valve 29 to force the burned and exhaust gases from the said chamber through the exhaust ports 31. The fuel or combustible gas for explosion in the combustion chamber, and supplied thereto by the opening of the valve 30, passes to the inlet opening controlled by the valve 30 from the passage 30b and fuel mixer 30c, seen best in Figure 1.

Figure 8:
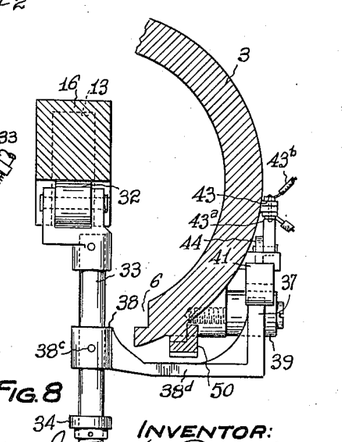
Figure 8 is a fragmentary sectional view bringing out more clearly a portion of the cylinder having the lock device cooperating with the spring actuated piston member and the switch parts coacting with the ignition means for exploding the combustible charges in the explosive chambers, the view being taken about on the line 8—8 of Figure 2, looking in the direction of the arrows.

The locking head 16 of each piston unit head 13 has a roller 16a at its inner lower portion adapted to contact with a roller 32 at the outer end of the locking member 33 which member is slidably mounted as seen best in Figures 2 and 8 in a bracket 34 offstanding from the associated driving arm 12. The bracket 34 is bifurcated and between the bifurcations is a spring 35 coiled about the member 33 and bearing at its lower end against the lower portion of the bracket and at its upper end against a collar 33' on the member 33, the spring tending to force the lock member 33 radially from the axis drive shaft 9 to cause the roller 32 to enter a notch 36 formed on the inner side of the locking head 16.

The purpose of the locking member 33 is to lock and release the piston member 17 in its position compressing the springs 19 and 19' as shown in Figure 2 and with the piston unit thus contracted. The locking member 33 enters the cylinder through the space 6 between the sections 2 and 3 at the inner periphery of said cylinder, and said locking member 33 is adapted to be actuated as it rotates with the associated driving arm 12 by means of a radially slidable cam member 37 which is of somewhat stem-like structure and mounted on a bracket 38 projecting laterally from the adjacent coacting locking member 33. The release member or cam 37 is pushed outwardly radially by spring 35 engaging the part 33', said spring normally holding the member 37 in such position so that it will operate in a path of movement, as the driving arm 12 carrying same rotates counterclockwise as viewed in Figure 1, which path of movement will cause the cam member 37 to engage a roller 39 mounted on a suitable bearing stud 40 projecting outwardly from the cylinder adjacent to the explosion chamber with which it is associated as seen best in Figure 1. Upon contact of the cam member 37, during its revolution with the roller 39 the member 37 will be depressed inwardly toward the axis shaft 9.

The bracket 38 supporting the member 37, as seen in Figure 8, has a horizontal arm 38d rigidly attached at 38c to the intermediate portion of the locking and release member 33. Thus, if the cam member 37 is tripped inwardly by engaging the roller 39, the member 33 is also pulled inwardly toward the axis 9 and out of the notch 36 in the locking head 16, thereby releasing said locking head for operating purposes to be later set forth.

Figure 1:
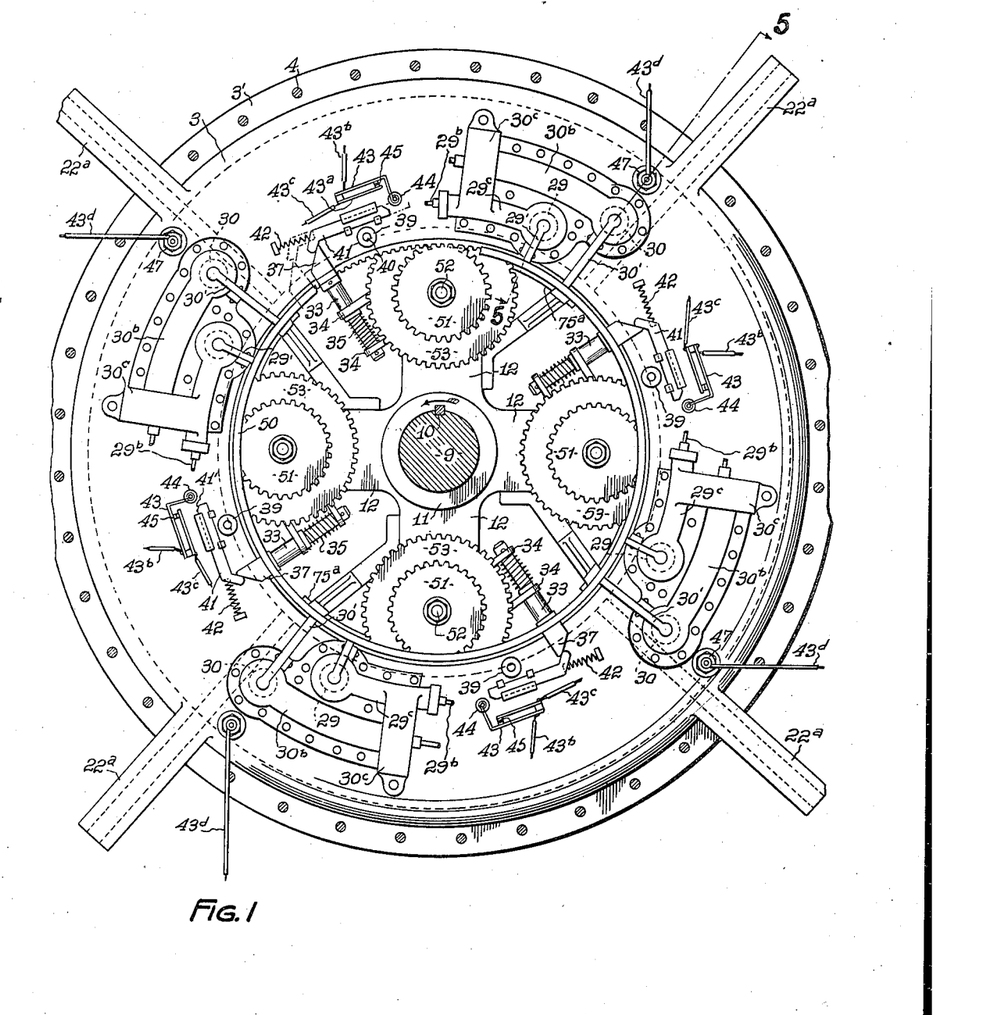
Figure 1 is a side elevation of an engine embodying the general features of the invention.

It is contemplated that after the engagement of the cam member 37 with the roller 39, said cam member shall impinge and move an actuating slide 41 forming a part of the ignition mechanism for each combustion chamber of the cylinder. The slide 41 is pulled to the right as seen at the top of Figure 1, by a spring 42, normally to thus maintain the roller 44 of the contact member 43 in a position separating the contact points 45 to maintain the ignition parts inactive. The contact member 43 coacts with a mating contact member 43a and these members are connected in a system of wiring including the leads 43b, 43c, and a lead 43d, the last lead wire connecting to the spark plug 47 for the combustion chamber. The actuating slide 41 has a dwell or cam 41' therein, down which the roller 39 may drop, and therefore the sliding movement of the member 41 is capable of causing opening and closing of the contact points 45 for controlling the time of explosion of the combustible charge in the associated combustible chamber.

Any suitable type of ignition mechanism of the class described, including the switch that comprises the contact members 43, 43a may be employed, since this is not important to the invention. The system of wiring for the engine is not illustrated as this may be conventional with the usual source of electric current for the various switches comprising the parts 43 and 43a.

It being borne in mind that the piston member 17 is movable relatively to the piston member 18, and therefore movable relatively to the head 13 to which the locking head 16 is affixed or stationary, it is noted that said piston member 17 is connected to the head 16 by a connecting bar 55, on the underside of which is a rack 55a. The bar 55 is attached to the head 16 by any suitable fastening 57 at one end of the bar, and the other end of the bar is attached to the piston member 17 by suitable bolts or fastenings 58. The arm 12 supports rollers 56 at its outer end that operate on the outer surface of the bar 55 to guide said bar in its movement and thus correspondingly assist in guiding the movement of the piston member 17 relatively to the piston member 18, though said member 17 is largely guided in its movement by its contact with the inner walls of the cylinder comprising the sections 2 and 3.

It is contemplated that the piston member 17 of the piston unit shall be adapted to be forced toward its contracted position of Figure 2 in full lines, by the explosion which takes place in the combustion chambers during the revolution of the piston in the cylinder. It is further contemplated that mechanical means shall be provided for accomplishing the same action of the part 17 to shift it from its expanded position relatively to the part 18, to said contracted position in which the springs 19 and 19' are compressed. It is further contemplated that by the release of the piston member 17 from the lock member 33, see Figure 2, the springs 19 and 19' shall push the member 17 away from the member 18 to produce compression of the gaseous charge to be exploded in each combustion chamber, as will be more fully pointed out hereinafter.

Each combustion chamber is located at one side of the location point of each abutment 21, to the left of the abutment 21, as illustrated in Figure 2. Obviously, each chamber is established as a closed chamber by the walls of the sections 2 and 3 of the cylinder, by the abutment 21, and by the piston unit comprising the members 17 and 18. However, since the chamber of the cylinder is open at its inner periphery, as by the provision of the space 6, it is necessary, when the combustion chamber is capacitated for the explosion of the charge therein, that said space at the innermost portions of the parts 21, 17, and 2 and 3 shall be closed, and for this purpose I provide upon each of the driving arms 12 a bracket 75, see Figures 2 and 5, which bracket carries a closure member 75a for the space at the inner end of the explosion chamber when this chamber is rendered operative by the inward positioning of one of the abutments 21 and the proper position spaced therefrom of the piston unit comprising the members 17 and 18. The closure plate 75 is merely a plate traveling in the space 6 between the sections 2 and 3 of the cylinders, see Figure 2, and turns or revolves with the driving arm 12 carrying it during the rotation of the latter.

Before reaching the operation of the invention, it will be quite clear that if an explosion of the gaseous charge in the combustion chamber, generally designated at A in Figure 2 takes place, the piston member 17 will be forced toward the member 18 and thereby carry the head 13 and the locking head 16 supported thereon in the same direction, moving relatively, however, to the driving arm 12. In other words, the piston unit head 13 and head 16 are virtually slidable on the outer end of the driving arm 12. When the said movement of the piston member 17 takes place, compressing the springs 19 and 19', and carrying the locking head 16 to the point where its notch 36 receives the automatically outwardly propelled locking member 33 and its roller 32, it is obvious that the piston member 17 will be then locked in its contracted position so that if it is later released, the springs 19 and 19' will expand the piston unit for the purpose of compressing the gaseous charge in the manner previously indicated.

The foregoing action of contracting the piston unit and automatically causing its release as described will be a function of operation of the engine as the explosive force of combustion in the combustion chamber takes place through the ignition of the charge. This will be a constantly repeating cycle of action of the piston unit now to be contracted by the explosion in the combustion chamber and thereafter for the piston member 17 to be released for its gas or explosive mixture compressing operation.

However, in order that the piston unit may be contracted to its compressing position when the engine is started into operation, as by means of any suitable starter connected with the driving shaft 9, some mechanical means must be employed for conditioning the piston units to assume their contracted positions for their gas compressing operations, and, with this in mind, there is provided mechanism for each of the piston units shown best in Figure 2 and Figure 4 as including a gear ring 50 stationarily attached to the outer lower side of the section 3 of the cylinder, the internal teeth of which gear ring mesh with a gear 51 on a shaft 52 mounted on the driving arm 12. Shaft 52 carries another gear 53 that meshes with a gear 54 which is located within the cylinder and mounted on a suitable bearing stud carried by the plate 15 and designated 54a. The gear 54 in turn meshes with the rack 55a of the actuating bar 55 previously described.

Bearing in mind that the driving stroke of the piston unit 17—18 is counter-clockwise, as seen in Figure 2, the turning of the gear 54 in a counter-clockwise direction will cause a shifting of the head 13 and parts 16, and 17 in a corresponding direction such as will effect the contraction or the collapsing of the piston members 17 and 18 together to prepare the same for the compression action of the member 17 at the proper time in the engine operation.

In the ordinary operation of the engine, the timing is so arranged that the explosion will take place at a point before the springs 28 are fully expanded for the purpose to be later set forth.

The above action is only necessary when starting the engine or when the spark fails to explode the charge in a combustion chamber.

The gear 51 has a clutch member 61 splined thereto on the hub of the gear and spring pressed by springs 64 toward a clutch member on the gear 53 comprising the clutch lining or face 63. The clutch plate or member 61 has a corresponding clutch lining or face 62 to engage the clutch element 63 aforesaid. Operating means for the clutch member 61 is employed in the form of a lever 65 which has a central yoke or ring-like portion 65', bearing rollers 66, see Figure 9 and Figure 2, the said rollers engaging the outer side or face of the clutch member 61 and adapted to act thereon to press the same out of engagement with the clutch member 63. The lever 65 is pivoted to the driving arm 12 at 65a and at its upper end the lever 65 engages an arm 66' of the lever 68, said lever 68 being pivotally supported on the driving arm 12 having camming faces 68' designed to engage corresponding camming surfaces 68''. Only when the engine fails to fire or when it is to be started, the piston unit, which includes 17, 13, 55, and 16, will rotate slightly more in a clockwise direction under compulsion of spring means 19, and bring into action the lever 68 and its coacting members. Clockwise movement of the lever 68 on pivot 68a is caused by contact of roller 70 which is carried by the head 16 at the side of notch 36 opposite that having roller 16a, coming in contact with surface 68b and is adapted to cause an inward or closing action of camming surfaces 68' and 68'' under the pressure of spring 68c, allowing lever 65, which rests on arm 66' to also move inwardly, whereby to effect engagement of clutch parts 62 and 63 during counter-clockwise motion of driving arm 12. When the head 16 has been returned to its locking position through action of gear 51 through clutch members 62 and 63 acting on gears 53 and 54 and rack 55, the roller 70 contacts the outer end of the lever 68 at 68d, causing it to move in counter-clockwise direction and raise the arm 66 on which lever 65 rests, through separating spring 68c, and thus release the clutch 62—63 by separation of its members 62 and 63.

It will be understood from the above that the timing of the engagement of the clutch through the aforesaid means, will be such that it cannot take place when the engine is in normal operation, since the piston unit is conditioned for compressing action by the explosion of the gaseous mixture. Only under such certain conditions as above described will engagement take place.

The operation of my engine will be generally understood from the foregoing description of its construction, but a brief summary of such operation is as follows:

In Figure 2 the positions of the parts of the piston unit and associated controlling mechanism are illustrated as when the said unit has passed some distance beyond the point of location of the abutment 21 and the said abutment has been caused to move into the cylinder so as to provide one side of the combustion chamber. The said view also illustrates the piston unit as when the explosion of the charge in the combustion chamber A has taken place, causing the contraction of the unit members 17—18. Of course, the initial force of the explosion against the piston member 17 compresses the springs 19 and 19' and forces the member 17 toward the member 18 along with a corresponding movement in the same direction of the bar 55 and head 13 slidably mounted on the driving arm 12, and the locking head 16. When the springs 19 and 19' are compressed to their maximum, the force of the explosion in the combustion chamber A is transmitted through the piston member 18 to the driving arm 12, and the driving torque is thus transmitted from the piston unit to the shaft 9 by said driving arm 12. The piston unit, as shown at 17—18, in its contracted condition is carried by the force of the burning fuel in the chamber A around the cylinder to the next explosion chamber A located in the cylinder about 90° from the location of the chamber illustrated in Figure 2. As the piston unit reaches the second mentioned explosion chamber A, into which the fresh fuel will be drawn ready for burning upon operating of the ignition mechanism, the lock member 33 will be caused to be operated by the cam member 37 engaging the roller 39, and thus will release the locking head 16 just before the explosion takes place in the second chamber. As soon as the head 16 is released, the springs 19 and 19' immediately act to force the piston member 17, head 13, bar 55 and head 16 in a clockwise direction. The member 17 now working in the second explosion chamber will compress the charge of fuel supplied thereto through the valve port 30, and, as soon as said compression action is completed, the ignition devices operate to explode the charge in the second compression chamber and thus transmit the driving torque of the piston unit 17—18 to the driving arm 12, a second time. As the piston unit 17—18 on the driving arm 12 passes the point of location of the abutment 21, the abutment will immediately be caused to move into place very rapidly because of the timing of the cams which control this movement, and therefore, a closed chamber will be seen to be provided wherein the movement of the piston unit 17—18 further in a counterclockwise direction will begin to create a vacuum in this closed chamber, and as the piston unit moves sufficiently by the point of location of the intake valve 30, the intake valve will be caused to open in accordance with the timing of the cam ring 30'' causing actuation of the rocker arm 30', and thereafter, still further movement in a counterclockwise direction of the piston unit 17—18 aforesaid will cause the fuel mixture to be drawn in by vacuum created in the combustion chamber from the fuel mixer 30b, and thus a mixture is provided in the chamber which will be caused to explode as above set forth. This same cycle of action takes place at the third and fourth combustion chamber stations A of the cylinder 2—3 and the periodic continuing explosions of the gaseous mixture in the explosion chambers A maintains a continuous driving action upon the arms 12, at the outer ends of which each of the piston units and associated mechanisms described are carried. Of course, the action of the abutments 21 is timed so that each abutment will be moved outwardly from the cylinder out of the path of movement of the piston unit before the piston unit reaches the point of location of the abutment upon the cylinder.

The provision of the train of drive gearing 50, 51, 53 and 54 is intended to compel a movement of each piston member 17 toward its cooperating piston member 18 for contracting the said piston unit to condition the same for its compression action only, in the event it is not contracted when the engine is started, for instance, or in the event that the explosive charge in a combustion chamber A may have not been ignited through missing operation of the ignition devices. In the starting of the engine the said gearing will always properly condition the piston units to assume their contracted disposition, though an explosion has not taken place in the chamber A due to the fact that the engine shaft 9 is preliminarily driven by a starting motor of some kind in the starting operation of the engine.

The explosion of the gases in the combustion chamber takes place after the piston member 17 has been released to compress the gases. When the piston member 17 has moved to the right of the exhaust ports 31 as seen in the reverse view, Figure 3, the latter are open for evacuation of the exhaust gases by the then timed admission of the scavenging air, under control of air valve 29 (see Figure 5).

Figure 12:
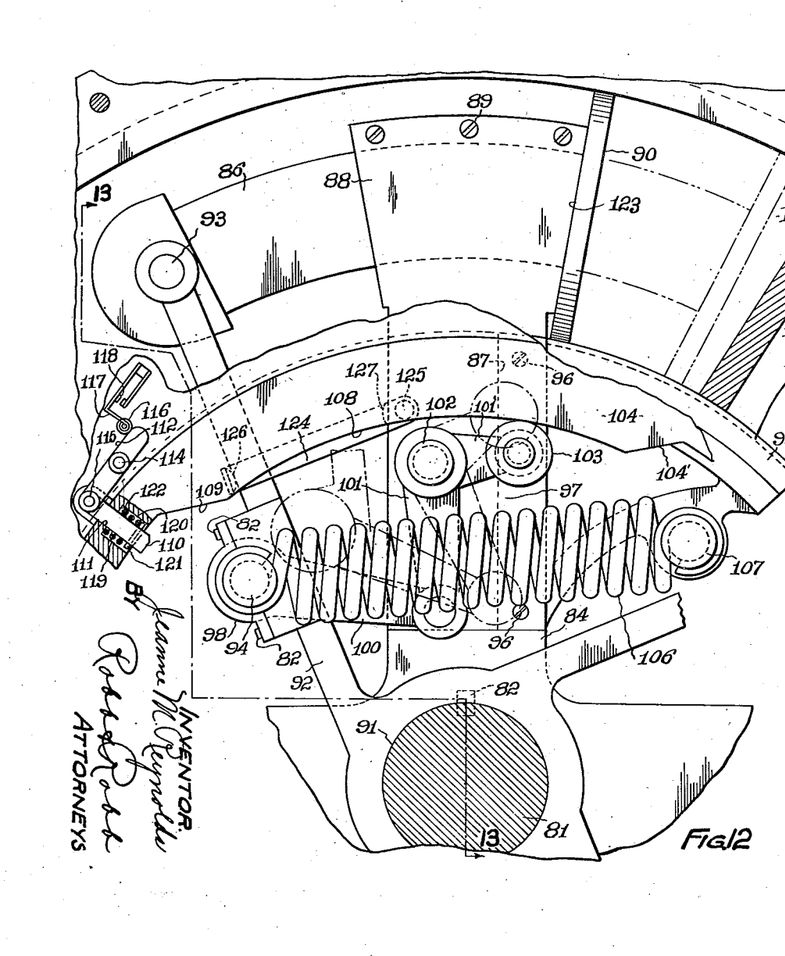
Figure 12 is a fragmentary sectional view bringing out more clearly a portion of the cylinder having piston conditioning means cooperating with the spring actuated piston member and the switch parts coacting with the piston conditioning means for exploding the combustible charges in the explosive chambers.
Figure 13:
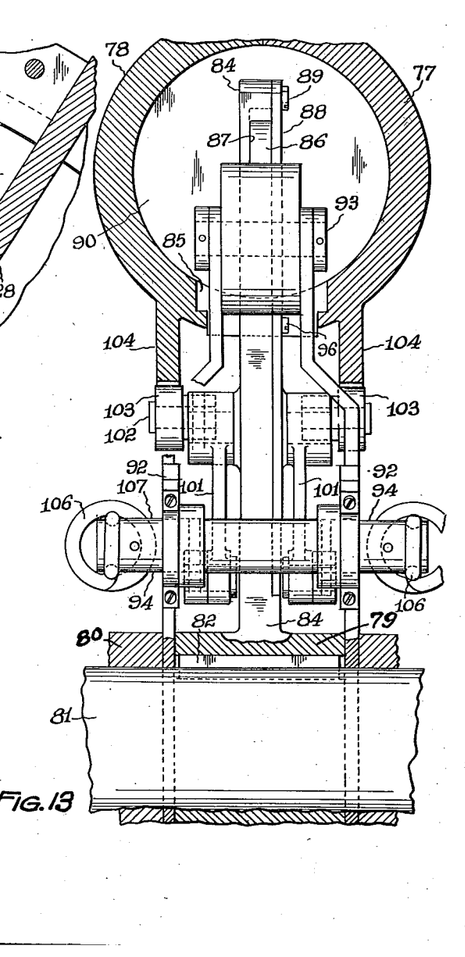
Figure 13 is a fragmentary vertical sectional view taken about on the line 13—13 of Figure 12, showing a portion of the annular cylinder, one of the piston mechanisms or unit thereof with the controlling devices therefor and the relation between the piston mechanism cylinder and the central or concentric driving shaft.

A modification of the form of engine piston hereinbefore described is illustrated in the additional Figures 12 and 13, and embodies certain modifications in the piston structure, in the means for positioning the piston for firing and other features that tend to simplify the engine, but produce the same desirable results of the previously described invention.

Referring to the drawings, the annular or circular cylinder 77—78 is of substantially the same construction as shown in Figure 4. The cylinder is likewise supported in substantially the same manner by the housing.

The central hub 79 of the radial drive arms 84 is concentric with the cylinder 77, the drive shaft 81 passing through the bearing 80 engaged with a housing, not shown but similar to the housing 7 previously referred to. The hub 79 is keyed to the drive shaft, as at 82, and from the hub extend a series of radial driving arms 84 that lead outwardly, passing through the space 85 at the inner periphery of the cylinder 77, entering the annular chamber as shown in Figure 13.

Only one driving arm is illustrated, but, of course, within the scope of the invention, any suitable number of these arms may be provided and for each member the piston means hereinafter to be described.

Since each arm 84 and its cooperating piston unit and mechanism are the same, only one set will be described in detail, along with the contacting associated parts that differentiate the aforesaid mechanism from that disclosed in my first form and before described.

Each arm 84 carries at its outer end and within the cylinder, an arch-shaped head 86 slidably mounted in the arm 84 in a slot or recess 87 shown in Figure 12. The head 86 is suitably guided in the recess 87 by means of a plate 88 fastened to the member 84 by bolts 89. At one end, the head 85 is provided with a piston member 90 suitably fastened thereto and conforming in external dimension with the internal conformation of the cylinder so as to slide in the latter with the periphery of the member 90 in contact with the inner walls of the cylinder.

The abutments 128 which block off the cylinder into a series of combustion chambers, having been described in the previous form of my invention and being the same and operating in the same fashion, will not be described in relation to this form.

Likewise, the means for operating the same will also apply in this form. For similar reasons, the other means necessary for operation of this engine, including admission of fuel and exhausting of burned gases and other means, not described as being different, are the same in this form.

Radially extending from the shaft 81 into cylinder 77—78 and on a suitable bearing surface rotatable independently of the shaft 81 on a bearing surface 91 are radial piston arms 92, shown best in Figures 12 and 13, connected with the head 86 pivotally on the pivot shaft 93. The cylinder closure means 95 which is necessary to close that part of the cylinder which periodically becomes a combustion chamber is rigidly mounted on the driving arm 84, preferably in a recess 97 and suitably guided in the recess between plate 88 and the arm 84 by bolts 96. From Figure 13 it will be seen that the radial piston arms 92 and their associated coacting mechanisms, are in pairs, one set mounted on one side of the drive arm 84 and one set on the opposite side, connected to it by pivots 93 and 94. The head 86 and piston arms 92 will, therefore, move independently of 84—88 but on the same axis.

The pivot shaft 94 is secured to the radial arms 92 by suitable means on caps 98 bolted thereto by bolts 99, said pivot shaft being journaled in the bearings on arms 92 and in caps 98. This pivot shaft 94 carries one end of the expansion springs 106 which are suitably fastened thereto, the other ends being supported on the cylinder closure means 95 as by the bosses 107, said springs being adapted to expand under force of the explosion in chamber B, said explosion acting on the piston 90 through the head 86 and piston arms 92 on which 94 is mounted and causing the piston arms 92 to move in a counterclockwise direction.

In order to condition the engine for its compression action or in the event it fails to fire at any one of the firing positions, the mechanical movement of the piston head 90, mounted on the head 86, to the firing position is necessary and this is accomplished by the means and in the manner now to be set forth. In any case, the piston positioning mechanism now to be described will function during the operation of the engine.

Levers 100 are adapted to engage and be suitably fastened to the cam levers 101—101'. The cam levers 101—101', seen best in Figures 12 and 13, are pivoted at 102 to the drive arm 84 and have at substantially right angles, extending portions thereof, adapted to carry rollers 103, which, upon a movement of the driving arm 84, contact the cam rings 104, said cam rings being suitably fastened to the inner lower portion of the cylinder. Through this contact of the rollers 103 on the rising surface 104' of the cam rings 104, a clockwise movement is imparted to the cam levers 101—101', which, acting through the contacting levers 100, rotate the radially extending arms 92 in a counterclockwise direction. Since radial arms 92 are fastened at 93 to the head 86, head 86 will be moved arcuately through the recess 87 and the piston member 90 mounted on the head 86 will be moved arcuately through the recess 87 and the piston member 90 mounted on the head 86 will be brought to the pre-compression position close to the side of the driving arm 84 at 123. The cam surfaces 108 on cam rings 104 are so proportioned as to retain the piston in its position ready for compression, by maintaining the rollers 103 substantially inwardly, through the cam levers 101—101' on which these rollers are mounted and in turn the levers 100, acting with radial piston arms 92 with which the head 86 and piston 90 are connected at 93.

This position of these elements is maintained in the cycle for a predetermined time, at the end of which time the cam levers 101—101, on which the rollers 103 are mounted, contacting with the levers 100 and head bearing piston arms 92 at their respective pivot points, are moved in a clockwise direction, under the compulsion of springs 106 and permitted so to do by the movement of rollers 103 outwardly on to the dwells 109 of the cam rings 104. When the rollers 103 reach the aforesaid position on the cam ring, the piston 90 mounted on the head 86, moves clockwise and compresses the gaseous mixture which has been introduced between the abutments heretofore described in my previous disclosure, by the valve means also before described.

Further movement of the rollers 103 counterclockwise along the inner periphery of cam rings 104 brings the rollers in contact with a radially slidable cam member 110, disposed in a suitable opening 111 in the cam ring, said slidable cam moving outwardly radially and acting through lever 112 and pivoted thereto at 115, lever 112 being pivoted in turn at 114, on a suitable bearing stud projecting upwardly from the cylinder adjacent to the explosion chamber with which it is associated, permitting contact members 118 to come together and ignite the gaseous mixture in the combustion chamber, connected for firing in a system of wiring including leads previously described in my first form of invention. The system of wiring is not here completely illustrated as this may be conventional with a usual source of electric current for operation.

Normally the contact member 117, maintains the ignition parts 118 spaced apart, since a roller 116 on 117 rests on the lever 112. This lever 112 is held inwardly normally by the compression spring 119 around the cam member 110 in the recess 120 acting on a washer 121 suitably fixed on a slidable cam member 110 and against a shoulder 122 in the cam ring opening for the cam lever 110.

Before reaching the operation of the invention, it will be quite clear that if an explosion of the gaseous charge in the combustion chamber, generally designated at B in Figure 12 takes place, the piston member 90 will be forced toward the side of the drive arm 84, and thereby carry the head 86 and radial piston arms 92 connected therewith in the same direction, moving relatively, however, to the driving arm 84. In other words, the piston head 86 on which the piston member 90 is mounted is slidable in the outer end of the driving arm 84. When this movement of the piston member 90 and the head 86 takes place, the springs 106 on the radial piston arms 92 are expanded and the levers 100—101—101' move in a substantially clockwise direction owing to the interconnection of the radial piston arms 92 and driving arm 84 through levers 100—101—101'. The fact that springs 106 are also secured at one end to the combustion chamber closing means 95, which in itself is fastened to the driving arm 84, the driving arm 84 is also moved in a counterclockwise direction.

When the piston head 90 reaches a position approximately against the side 123 of the driving arm 84, it is retained in close relation with this shoulder by the roller 103 acting through the cam lever 101'—101 and the lever 100 rolling along the surface 108 of the cam ring 104, and is retained in this position until the roller 103 has reached and moved outwardly along the dwell 109 on the cam ring 104, when said piston 90 on the head 86 again moves clockwise and compresses the gaseous mixture in the next chamber.

There is provided also a shock absorbing means to absorb the shock of too heavy an impact of piston 90 against the shoulder 123 of the driving arm 84 in the form of a suitable member 124, best shown in Figure 12, said member being of such conformation as to allow the free passage of the radial arms 92 through it and confine their arcuate motion in the loop portion thereof. This loop member 124 is rigidly mounted to the driving arm 84 at 125 and embodies bumper 126 of suitable material at its outer end. A complementary bumper 127 is mounted on the driving arm 84. These bumpers absorb some of the shock of the explosion and some of the torque is transmitted through them to the driving arm. The loop prevents a shattering impact on the inside of the piston 90 against the shoulder 123 on the driving arm 84.

The movement of the piston unit and the timing of its release has heretofore been described and will be a function of the operation of the engine as the explosive force of combustion in the combustion chamber takes place through the ignition of the charge. This will be a constantly repeating cycle of action of the piston unit, to be moved by the explosion in the combustion chamber and thereafter for the piston member 90 to be released for its explosive mixture compressing cooperation.

The operation of this modification of my engine will be generally understood from the foregoing description of its construction, but a brief summary of such operation is as follows:

In Figure 12 the positions of the parts of the piston unit and associated controlling mechanism are illustrated as when said unit has passed the point of location of the abutment 128 and the said abutment has been caused to move into the cylinder so as to provide one side of the combustion chamber. This view also illustrates the piston unit as when the explosion of the charge in the combustion chamber B has taken place, moving the piston 90 against the shoulder 123 of the driving arm 84. Of course, the initial force of the explosion against the piston member 90 expands the springs 106 and forces the member 90 toward the driving arm 84, along with the corresponding movement in the same direction by the radial piston arms 92, the same being connected to the head 86 and slidable through the recess 87 in the outer end of the driving arm 84.

During the expansion of the springs 106, the driving arm has been moved somewhat in a counterclockwise direction. When the piston 90 has moved substantially against the driving arm, the full force of the explosion is transmitted to the driving arm 84 and the driving torque is thus transmitted from the piston unit to the shaft 81 by said driving arm 84.

The piston 90, as shown in Figure 12, in its locked condition is carried by the force of the burning fuel in the chamber B around the cylinder to the next explosive chamber B located in the cylinder about ninety degrees from the location of the chamber illustrated in Figure 12. As the piston unit reaches the second mentioned explosion chamber B into which the fresh fuel is induced and made ready for burning upon operating of the ignition mechanism, the cam members 101—101' will turn clockwise as the rollers 103 ride outwardly along the cam rings at 109. The levers 100 will also move relatively in cooperation with the cam members 101—101', and carry with them in a clockwise direction the radial piston arms 92 under the compulsion of the contacting springs 106. Since the head 86, on which the piston head 90 is mounted, is directly connected with the aforesaid radial piston arms 92; this unit will also move in a clockwise direction. The radial piston arms 92 now working in the second explosion chamber will compress the charge of fuel supplied thereto, from the fuel mixer, and as soon as said compression action is completed, the ignition devices actuated by contact of the rollers 103 on the radial cam arm 111 at 110, operate to explode the charge in the second compression chamber B and thus transmit the driving torque of the piston unit 90 to the driving arm 84 a second time. This same cycle of action takes place at the third and fourth combustion chamber stations B of the cylinder 77—78 and the periodic continuing explosions in these chambers maintain a continuous driving action on the arm 84 at the outer ends of which each of the piston units and associated mechanism described are carried.

Of necessity, the action of the abutments 128 is timed so that each abutment will be moved outwardly from the cylinder out of the path of movement of the piston unit before the piston unit reaches the point of location of the abutment upon the cylinder.

The camming levers 101—101' and 100 and the cam ring 109 are intended to cooperate for the purpose of moving the piston against the shoulder 123 on the drive arm 84, in the event the engine fails to fire or in starting the engine, and serve the function of retaining the piston 90 against the shoulder 123 on the drive arm 84 for a predetermined period until the engine is again ready for compression of the gaseous mixture.

Since the provisions for evacuation of exhaust gases through exhaust ports, and the scavenging of these gases, are the same as in my original disclosure, they will not be further described.

Having thus described my invention, what I claim as new and desire to secure by Letters Patent of the United States, is:

1. In an internal combustion engine, in combination, an annular cylinder, an engine shaft concentric to said cylinder by location at the axis of the latter, radial drive arms moving with the said engine shaft and extending therefrom into the cylinder, the cylinder being formed with spaced portions at its inner side through which the drive arms pass, movable abutments mounted on the cylinder and movable into the same to provide a wall of a combustion chamber, and movable out of the same so as not to obstruct the movement of the arms, piston means mounted on the outer ends of the drive arms, said piston means comprising for each drive arm a head movable upon the drive arm within the cylinder, a piston unit carried by said head and adapted by its movement to transmit driving torque to the head and therethrough to the drive arm with which the piston unit is associated, said piston unit comprising a contractable and expansible piston structure, means for expanding the piston structure, means for locking the piston structure in contracted condition, means for admitting a fuel mixture into the cylinder, timing means for said means, and means for releasing the piston structure when contracted so that by expansion thereof gases in a combustion chamber of the cylinder will be compressed, together with closure means for the space at the inner side of the cylinder cooperative with an associated abutment and piston means to provide for confining of combustible gases introduced into a portion of the cylinder forming said combustion chamber.

2. An engine as claimed in claim 1, wherein the contractable and expansible piston structure includes a stationary piston member connected with the drive arm to move therewith, and a cooperating piston member carried by the movable head on the drive arm, a locking head on the movable head, and connecting means between the relatively movable piston member and the locking head, the means for expanding the piston structure including springs interposed between the movable piston member and the relatively stationary piston member.

3. An internal combustion engine as claimed in claim 1, combined with mechanical devices for operating the movable piston member and locking head to effect contracting of the piston structure as set forth, and means for timing the action of the mechanical devices.

4. An internal combustion engine as claimed in claim 1, in which the explosion in the combustion chamber is adapted to act upon the movable piston member for contracting the piston structure and shifting the locking head to locked position, combined with other means carried by each drive arm for effecting such contracting action of the piston structure when the explosion in the combustion chamber fails to effect the contracting action.

5. An internal combustion engine as claimed in claim 1, in which the explosion in the combustion chamber is adapted to act upon the movable piston member for contracting the piston structure and shifting the locking head to locked position, combined with other means carried by each drive arm for effecting such contracting action of the piston structure when the explosion in the combustion chamber fails to take place, including an actuating bar connecting the movable piston member with the locking head, drive gearing carried by each drive arm, gearing carried by the cylinder cooperating with the drive gearing, and instrumentalities for periodically transmitting the drive action of the drive gearing to said actuating bar during the rotation of the drive arms and when the movable piston member is in expanded position.

6. An internal combustion engine comprising, in combination, an annular cylinder, an engine drive shaft, a radial arm fixed to the drive shaft and extending therefrom into the cylinder, the cylinder having an open portion at its inner part through which the drive arm extends into the cylinder, means carried by the drive arm for closing a portion of said open part of the cylinder to provide a bottom wall for a combustion chamber therein, an abutment movable into and out of the cylinder and when in the cylinder constituting an end wall of such combustion chamber, means for admitting a fuel mixture into said combustion chamber, piston mechanism including a driving head movably mounted on the outer end of the drive arm, a movable piston member carried by said driving head, a stationary piston member carried by said drive arm, a locking head carried by said driving head, means for expanding the piston mechanism aforesaid by movement of the movable piston member relatively to the stationary piston member, a bar connecting the movable piston member with the locking head, a locking member carried by the drive arm to coact with the locking head to hold the piston members in contracted position during a predetermined movement of the piston parts in the cylinder, and means for releasing the locking head from the locking member at a predetermined point in the movement of the piston in the cylinder to permit the expanding means for the piston members to expand them and compress gases in the cylinder.

7. An internal combustion engine as claimed in claim 6, combined with gearing intermediate the cylinder and the movable piston member for causing a contracting of the two piston members to condition the movable piston member for expansion by the expanding means, for the purpose stated.

8. An internal combustion engine as claimed in claim 6, combined with gearing intermediate the cylinder and the movable piston member for causing a contracting of the two piston members to condition the movable piston member for expansion by the expanding means, for the purpose stated, said gearing comprising a part normally driven during the turning of the shaft and drive arm, and clutch means operable when the piston mechanism is expanded for connecting said drive gear to the movable piston member to actuate the latter to contract the piston means to prepare the same for compressing movement of gases by the movable piston member.

9. An internal combustion engine as claimed in claim 6, combined with gearing intermediate the cylinder and the movable piston member for causing a contracting of the two piston members to condition the movable piston member for expansion by the expanding means, for the purpose stated, said gearing comprising a part normally driven during the turning of the shaft and drive arm, and clutch means operable when the piston mechanism is expanded for connecting said drive gear to the movable piston member to actuate the latter to contract the piston means to prepare the same for compressing movement of gases by the movable piston member, in which the expanding means comprises expansion springs interposed between the movable piston member and the relatively stationary piston member.

10. An internal combustion engine as claimed in claim 6, combined with gearing intermediate the cylinder and the movable piston member for causing a contracting of the two piston members to condition the movable piston member for expansion by the expanding means, for the purpose stated, said gearing comprising a part normally driven during the turning of the shaft and drive arm, and clutch means operable when the piston mechanism is expanded for connecting said drive gear to the movable piston member to actuate the latter to contract the piston means to prepare the same for compressing movement of gases by the movable piston member, in which the expanding means comprises expansion springs interposed between the movable piston member and the relatively stationary piston member, and in which the actuating bar is equipped with a rack geared to the said drive gearing.

11. In an internal combustion engine, in combination, a cylinder, a piston unit operating in said cylinder and comprising movable piston members, means for expanding the said piston unit to cause separation of the members thereof for effecting compression of gases in the cylinder by one of said members, means for locking the said one member in a position near the other piston member for thus maintaining the piston unit in contracted condition, means to release the said one piston member at a predetermined point in the movement of the contracted piston, and means for supplying gases to said cylinder.

12. An engine as claimed in claim 11, in which the expanding means comprises springs between the piston members, the said one piston member being operable to its contracted position by explosion of gases in the cylinder.

13. An engine as claimed in claim 11, in which the expanding means comprises springs between the piston members, the said one piston member being operable to its contracted position by explosion of gases in the cylinder, and mechanical devices for also contracting the piston as above described.

14. An internal combustion engine comprising, in combination, a cylinder, a piston unit mounted in said cylinder, a driving member connected with said piston unit, the piston unit being operable by combustion in the cylinder to effect driving action of the piston unit and driving member connected therewith, means for mechanically effecting movement of the piston unit independently of the action of combustion in the cylinder for conditioning the piston unit to assume a position for compressing the gases in the combustion chamber, instrumentalities for maintaining the piston unit in the said last mentioned position, means to release said instrumentalities and thereby release the piston unit for its compressing action at a predetermined point in the movement of said unit, and means for effecting compression action of the piston unit when released.

15. An internal combustion engine as set forth in claim 14, combined with a locking member engageable to hold the piston unit in its position for compressing the charge of explosive mixture in the cylinder, said locking means being operable by the release means aforesaid for the purpose stated.

16. An internal combustion engine as claimed in claim 14, wherein the piston unit is movably mounted on the driving member and movable relative thereto to condition it for compressing the explosive mixture in the cylinder, holding means for holding the piston unit in said conditioning position and operable by the release means, and means for effecting compressing action of the piston unit when released.

17. In an internal combustion engine, in combination, a cylinder, a driving arm, an engine shaft carrying said driving arm and operable thereby, a piston unit in the cylinder movably mounted upon the driving arm, means for admitting an explosive mixture into the cylinder, means for causing a relative movement of the piston unit and driving arm to effect compression action of the piston unit upon an explosive mixture in the cylinder, the piston unit being operable by combustion of gases in the cylinder, and means for operating the piston unit independently of its movement by the combustible gases in the cylinder for shifting said piston unit relatively to the driving arm to condition and hold the unit to assume a position for compressing gases when released from its holding position, and means for releasing the piston unit to permit movement thereof in a direction reverse to its above mentioned movements, whereby to enable the unit to effect compression of gases in the cylinder preliminary to the explosion of said gases.

18. An internal combustion engine comprising, in combination, a cylinder, a piston unit mounted in said cylinder, a driving member connected with the piston unit, the piston unit being operable by combustion in the cylinder to effect driving action of the unit and driving member connected therewith, a piston arm, a head carried by the piston arm and connected with the piston unit and movable relatively to the driving member, means intermediate the driving member and the said piston arm for mechanically effecting movement of the piston unit independently of the action of combustion in the cylinder to condition the piston unit to assume a position to compress gases in the cylinder, including means for holding the piston unit in a position upon the said head conditioned for compression of gases in the cylinder, means to release the holding means at a predetermined point in the movement of the piston unit, means for admitting gases into the cylinder, and an instrumentality to effect gas compressing movement of the piston unit when released.

19. An internal combustion engine as claimed in claim 18, wherein a common axis is provided for the driving member and the piston arm, together with spring means operatively connecting the driving member and piston arm and constituting the means for causing the gas compressing movement of the piston unit.

20. An internal combustion engine as claimed in claim 18, wherein a common axis is provided for the driving member and the piston arm, together with spring means operatively connecting the driving member and piston arm and constituting the means for causing the gas compressing movement of the piston unit, said mechanical means and the holding means thereof comprising a cam coacting with the holding means and so constructed as to release the latter for enabling the spring means to act upon the piston unit to effect its gas compressing function.

JEANNE M. REYNOLDS.